TWO-WAY TELEPHONE SYSTEMS WITH TALK-LISTEN SWITCHING

Filed May 1, 1961

INVENTOR
Arthur I. F. Simpson

Eugene J. Kalil
ATTORNEY 3,189,691

TWO-WAY TELEPHONE SYSTEMS WITH TALK-LISTEN SWITCHING

Arthur Ian Forbes Simpson, London, England, assignor to Modern Telephones (Great Britain) Limited, London, England, a British company Filed May 1, 1961, Ser. No. 106,667
Claims priority, application Great Britain, Apr. 29, 1960, 15,185/60
3 Claims. (Cl. 179—81)

Figure 1:
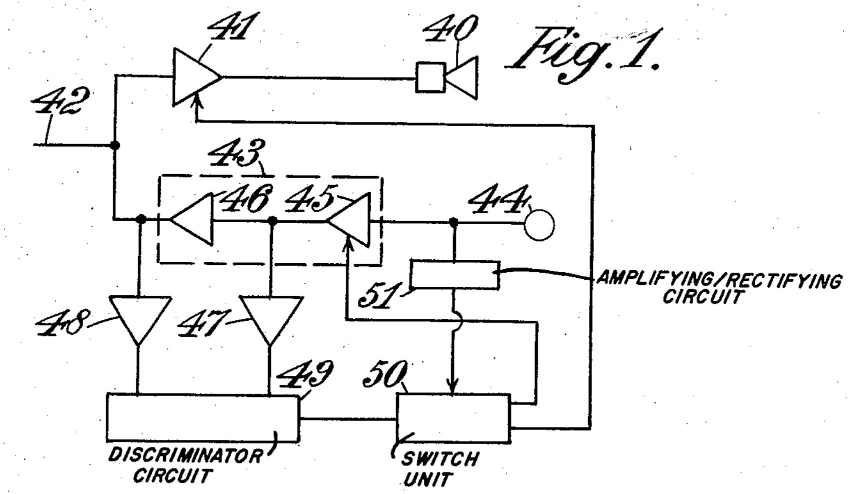

This invention relates to telephone systems with talk-listen switching for two-way speech communication over an interconnecting circuit between two stations. Such systems commonly use a loudspeaker at one or both stations and the loudspeaker may also be used for use as a microphone.

A telephone has been proposed for two-way speech communication over an interconnecting circuit between stations, in which there are provided at one of the stations separate speech channels with amplifiers for incoming and outgoing speech signals, switch means at that station responsive to signals in said interconnecting circuit operative, when such signals are present, to condition the speech channels for passage of incoming signals only, and inhibiting means responsive to speech for outgoing transmission from the station to prevent such outgoing speech signals from operating said switch means. Such a system will hereinafter be referred to as a system of the kind described. The switch means may be a mechanical switch such as relay or may be an electronic switching system. It will be seen that in this arrangement, if there are any signals on the interconnecting circuit, which generally would be a two-wire circuit, the switch means will condition the system for incoming speech signals. However, if there is no incoming signal, then if anyone should speak into a transducer at the station, the inhibiting means will prevent the outgoing speech signals from switching the speech channels and thus there will be no interference with the transmission of the outgoing speech. The switch means may readily be made to respond to incoming signals of a very low level, if necessary, so permitting communication over a long line or a line with a large loss, the limit being set by the noise level. Moreover, it is possible to provide automatic gain control for speech in either or both directions without affecting the operation of the switching.

In the aforementioned system a transducer may be arranged to act as a loudspeaker and also as a microphone. The transducer may be switchably connected by a relay either to the input of an outgoing speech amplifier or to the output of an incoming speech amplifier, the relay constituting the aforementioned switch means. Alternatively the transducer may be permanently connected to the incoming and outgoing speech amplifiers and the switching effect by control signals applied to the amplifiers. A separate microphone may be provided to give an over-ride control signal to enable the operator at the station to interrupt the incoming speech and reverse the direction of communication. The separate microphone is positioned so that it does not receive any substantial signal from the loudspeaker.

According to the present invention, in a system of the kind described, each station provided with said switch means has a separate microphone for the outgoing speech signals and the loudspeaker is permanently associated with the incoming speech amplifier.

In the arrangement thus far described, any incoming speech signals will always condition the system appropriately for that direction of communication. The distant speaker may therefore break into and interrupt outgoing speech. Over-ride means may be provided to enable incoming speech to be interrupted. For this purpose, there may be provided a mechanically operated switch. However there may be provided various forms of voice-operated over-ride circuit, the nature of which may depend on the type of voice for which the loudspeaking telephone is installed. For example, there may be provided a separate amplifier amplifying any sound signals at the station and arranged to provide an over-ride control. This amplifier would be arranged so that only signals louder than any break-through from the loudspeaker (or other reproducer) would operate the over-ride control.

The aforementioned microphone may be arranged to feed through two separate paths, firstly to the outgoing speech amplifier, and secondly to an amplifier for providing the supplementary control signal for over-ride control to enable the operator to interrupt incoming speech. The aforementioned switch means in this arrangement may be a relay arranged to disconnect the loudspeaker from the incoming speech amplifier when energised and to reconnect it when released or alternatively to switch a bias on the incoming speech amplifier. The relay may also be arranged to effect switching of the outgoing speech channel to prevent outgoing speech being transmitted if there is an incoming signal. The over-ride control operates to enable incoming speech to be interrupted if required. A similar arrangement may be employed with electronic switching, the microphone being connected by separate paths to the outgoing speech amplifier and to an over-ride control signal amplifier and the loudspeaker being permanently connected to the incoming speech amplifier, the switching control being effected by biasing the amplifiers.

Figure 2:
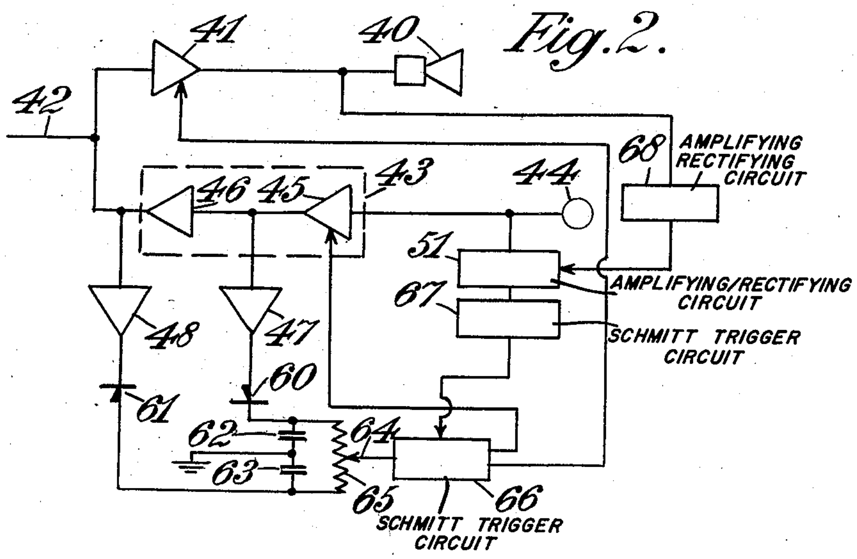

In the following description reference will be made to the accompanying drawings in which FIGURES 1 and 2 are each block diagrams illustrating stations for a two-way speech communication system.

Referring to FIGURE 1, there is illustrated one station of a loudspeaking telephone system having stations interconnected by a two-wire line. The other stations of the system may be similar or may be any other type of telephone station making use of a two-wire line for both incoming and outgoing speech. In FIGURE 1 there is shown a loudspeaker 40 permanently connected to the output of an incoming speech amplifier 41, the input of which is connected either directly or through a hybrid junction (not shown) to a two-wire line 42 which line serves to carry both incoming and outgoing signals. The line 42 is connected either directly or through the hybrid junction to the output of an outgoing speech amplifier 43, the input of which is permanently connected to a microphone 44. The microphone 44 is preferably so positioned on a cabinet with respect to a loudspeaker 40 in the cabinet to minimise the pick-up of sounds by the microphone 44 directly from the loudspeaker 40. The amplifier 43 has two stages 45, 46, each of which stages may for example comprise a multi-stage transistor amplifier. The outputs from the two stages 45, 46 are fed respectively to two limiting amplifiers 47, 48 respectively which provide the two inputs to a discriminator circuit 49. The limiting amplifier 48 amplifying the signals on the two-wire line 42. The second limiting amplifier 47 provides an opposing control signal so that, if there are outgoing speech signals only, the two limiting amplifiers 47, 48 will provide opposing signals to ensure, as hereinafter described, that the incoming speech amplifier remains cut off. In the arrangement illustrated in FIGURE 1, electronic switching is employed and the discriminator circuit 49 may comprise two rectifiers rectifying the outputs of the limiting amplifiers 47, 48 to provide two signals of opposite polarity which are applied via a resistive network to a capacitor which will be rapidly charged by the control signal since the charging circuit is made to have a low impedance. The capacitor thus does not introduce any appreciable delay in the initial switching when an incoming speech signal first appears. It does however delay the return of the circuits to the condition for outgoing speech so preventing switching during the intervals between successive syllables. The discriminator circuit 49 provides an output potential if there is a signal present on the line 42 irrespective of whether there is any additional signal present from the microphone 44 but gives no output if there is no signal on the line 42 apart from any signal from the microphone 44. The output from the discriminator is applied to a switching unit 50, which may for example be a Schmitt trigger circuit, providing switching signals for the amplifiers 41, 45. The necessary delay of for example 0.5 to 3 seconds in switching from incoming to outgoing speech may be obtained by means of said capacitor which may be arranged in the emitter circuit of an emitter follower feeding the input to the Schmitt trigger circuit. The incoming speech amplifier 41 is normally cut-off and is switched on by the output signal from the switching circuit, that is to say whenever there is an incoming signal on the line 42. In a typical construction, the amplifier 41 might comprise a transistor input stage driving a push-pull output stage, with the input stage normally held non-conductive but made conductive by the input signal from the switching unit 50. The outgoing speech amplifier 43 is normally operative and has to be cut-off by the signal from the switching unit 50 and conveniently the switching signal is applied to a switching transistor which is switched on when the unit 50 provides an output and which draws current to switch off the amplifier, for example by drawing current to bias two transistor amplifier stages to cut-off.

In the system of FIGURE 1, it may sometimes be required to break into incoming speech and there is provided an over-ride circuit for this purpose. The output from the microphone 44 is separately amplified and rectified in an amplifying and rectifying circuit 51 and then applied as an over-ride control signal to the switching circuit 50. Thus by speaking sharply into the microphone 44, the amplifier and rectifier 51 will provide sufficient output to effect switching so as to condition the system for outgoing speech instead of incoming speech.

FIGURE 2 illustrates a modification of the arrangement of FIGURE 1 and similar reference characters are used to indicate corresponding components and, in the following description, only the distinctive features of FIGURE 2 will be referred to. In FIGURE 2 the discrimination circuit is shown in more detail as comprising two rectifiers 60, 61 charging capacitors 62, 63 respectively. The control circuits have time constants such that the outgoing speech amplifier 43 is cut-off faster than the incoming speech amplifier 41 is switched on. The fast operation for cutting off the outgoing speech amplifier 43 may be obtained by making the internal impedances of the limiting amplifiers 47, 48 and their detectors 60, 61 low. The two detectors 60, 61 will have opposite poles connected to the aforementioned respective capacitors 62, 63 since they are to provide outputs of opposite polarity. Thus together with the limiting amplifiers 47, 48 they form a series circuit having a low impedance in the direction of current flow for the switching on of the incoming speech amplifier 41. It will be seen that the charge time will be independent of the discharge time so that the return delay may be longer if so desired. The two capacitors 62, 63 are charged with signals of opposite polarity so that, if only a signal from the microphone is present, there is no potential at the tap 64 on a potentiometer 65 across the two capacitors but there is a potential at the tap 64 if there is an incoming signal on the line 42 irrespective of whether a microphone signal is present or not. This potential is applied to a Schmitt trigger circuit 66 through a delay circuit providing the required delay in switching from incoming to outgoing speech. An over-ride control for effecting rapid switching when desired is formed by an amplifier and rectifier 51 feeding another Schmitt trigger circuit 67 providing an over-ride control over the output of the first Schmitt trigger circuit 66. The circuits are arranged so that, by speaking sharply into the microphone 44, the signal amplitude at the output of the amplifier and rectifier 51 is sufficient to trigger the Schmitt trigger circuit 67 and thus to condition the system for outgoing speech. A shutter circuit is provided however to inhibit such switching except during a pause at the end of a word or syllable in the incoming speech, this shutter circuit comprising an amplifier and rectifier 68 to amplify and rectify the signal when it is being fed to the loudspeaker input, the rectified output being used to change the level at which the rectified microphone signal will operate the Schmitt trigger circuit 67.

It will be seen that, if the microphone signal is sufficiently large, the trigger circuit 67 will operate to switch the system to the condition for outgoing signals. The shutter circuit prevents however such switching being effected by break-through from the loudspeaker 40 to the microphone 44. The circuit therefore distinguishes between a microphone signal which is produced by speaking directly into the microphone and a signal picked up by the microphone from the loudspeaker. The system would normally be arranged so that switching can only be effected when no signal is being fed to the loudspeaker, that is to say during pauses at the end of a word or syllable in the incoming speech. Thus to break in, it is necessary to speak loudly into the microphone and the required switching will be effected as soon as the output signal from the loudspeaker falls below a predetermined level, for example at the end of a syllable or a word.

I claim:

1. A telephone system for two-way speech communication over an interconnecting circuit between stations which circuit is common to speech signals in both directions wherein there are provided at one of the stations separate speech channels with amplifiers for incoming and outgoing speech signals, a loudspeaker connected to the output of the incoming speech amplifier, a microphone connected to the input of the outgoing speech amplifier, control means at that station adapted to provide a control signal when there is a speech signal in either direction present in said interconnecting circuit, switch means responsive to said control signal to condition the speech channels for passage of incoming signals only, inhibiting means responsive to speech for outgoing transmission from the station to prevent such outgoing speech signals from operating said switch means, and over-ride means to enable incoming speech to be interrupted, which over-ride means comprises a separate amplifier connected to said microphone for amplifying any sound signals at the station and arranged to provide an over-ride control signal, and means for applying said over-ride control signal to said switch means to condition the system for outgoing speech.

2. A telephone system as claimed in claim 1 wherein said inhibiting means are circuit means operative to derive a second control signal from the outgoing speech channel.

3. A telephone system as claimed in claim 1 wherein said amplifiers, switch means and inhibiting means are provided at each station.

References Cited by the Examiner

UNITED STATES PATENTS

| | | | |
|---|---|---|---|
| 1,924,131 | 8/33 | Sandemann | 179—170 |
| 2,093,525 | 9/37 | Mitchell | 179—170 |
| 2,129,990 | 9/38 | De Fremerey | 179—170 |
| 2,267,622 | 12/41 | Mitchell | 179—170.8 |
| 2,356,943 | 8/44 | Norwine | 179—170.2 |
| 2,424,069 | 7/47 | Tschumi | 179—170 |
| 2,468,553 | 4/49 | Herrick | 179—170 |
| 3,066,201 | 11/62 | Beucker | 179—170.2 |

ROBERT H. ROSE, *Primary Examiner.*

WALTER L. LYNDE, *Examiner.*